United States Patent [19]

Crain et al.

[11] 4,103,319
[45] Jul. 25, 1978

[54] HAZARD PREVENTION CIRCUIT FOR IMMERSION HEATERS

[75] Inventors: N. Robert Crain, Huntington Beach; Joseph S. Romance, Diamond Bar; Carson T. Richert, Buena Park, all of Calif.

[73] Assignee: Radiant Technology Corporation, Cerritos, Calif.

[21] Appl. No.: 810,183

[22] Filed: Jun. 27, 1977

[51] Int. Cl.² ............................................. H02H 5/04
[52] U.S. Cl. .................................. 361/106; 361/178; 219/322; 219/328; 219/331; 219/335; 219/481; 340/604; 340/640
[58] Field of Search ............... 361/178, 106, 104, 103, 361/165; 219/481, 494, 523, 501, 505, 509, 510, 514, 517, 316, 322, 328, 331, 333, 335, 363; 340/235, 242, 244 C

[56] References Cited

U.S. PATENT DOCUMENTS

| | | | |
|---|---|---|---|
| 3,119,953 | 1/1964 | Kendall | 361/178 |
| 3,525,902 | 8/1970 | Davidson et al. | 361/178 |
| 3,766,358 | 10/1973 | Gass-Erb | 219/481 X |
| 3,846,615 | 11/1974 | Athey et al. | 219/322 X |
| 3,983,361 | 9/1976 | Wild et al. | 219/523 X |
| 4,037,080 | 7/1977 | Owen | 219/322 X |

Primary Examiner—Patrick R. Salce

[57] ABSTRACT

A hazard prevention control circuit is provided for an electric heater having heating coils enclosed in a quartz tube immersed in a tank of solution. A circuit breaker is connected in series with a contactor coil controlling a set of contacts connecting the main lines of a power supply to the heating coils of the heater. Upon sensing a hazard condition, the control circuit causes excess current to flow through the circuit breaker to open the circuit and deenergize the contactor coil so as to open the contacts connecting the power to the heating coils. Transformers are provided for coupling power supplied by the main lines to the control circuit and the contactor coil and for coupling the pulse output of the control circuit to trigger a triac which conducts the excess current through the circuit breaker. These transformers serve to isolate the heating equipment as a safety precaution for the operator and to prevent the electronic components of the control circuit from being destroyed before the circuit breaker disconnects the power.

10 Claims, 5 Drawing Figures

HAZARD PREVENTION CIRCUIT FOR IMMERSION HEATERS

SPECIFICATION

This invention relates to electric immersion heaters and more particularly to a hazard prevention control circuit for use therewith.

Electric immersion heaters are commonly used in the plating and metal finishing business. They are designed to heat solutions used for the plating of metal parts. The problems encountered with the use of such electric immersion heaters include the dangers of possibly electrically shocking the operator, of possibly starting a tank fire, and/or of damaging associated equipment due to overheating. Thus, when one or more open heating elements, i.e., open resistance coils, are placed in a quartz tube immersed in a tank of solution to be heated and power is supplied to the heating elements there is relatively little danger to the operator. However, if the quartz tube happens to crack by accident, or age, the operating solution upon seeping through the crack and contacting the resistance coil could establish lethal voltage gradients throughout the operating fluid creating not only a personnel safety hazard but possible damage to the heater equipment.

In accordance with the present invention, a hazard prevention control circuit is provided for disconnecting the electric power to the immersion heater when a fault is sensed during its use. One of these faults is caused by the quartz tube being cracked or otherwise broken and the other fault is caused by the operating solution in the tank falling below the level needed for adequate cooling of the heater equipment.

The hazard prevention control circuit detects cracks in the quartz tube by providing a pair of spaced probes therein. When solution seeps into the broken quartz tube, these probes detect the presence of any moisture and complete a circuit causing the hazard prevention control circuit to immediately operate to disconnect the lines supplying the power to the heating coils. The hazard prevention control circuit further detects the lowering of the solution in the tank as caused by a leak, for example, by providing a thermistor in the tank adjacent the quartz tube of the immersion heater and at a point considered to be the lowest level which the solution should ever reach. When the operating solution in the tank is lowered below this level, for any reason, the rise in the temperature of the immersion heater is sensed by the thermistor causing the hazard prevention control circuit to operate to disconnect the power supply to the heater.

Accordingly, one of the objects of the present invention is to provide a hazard prevention control circuit for use with an immersion heater being used to heat a solution in a metal finishing tank.

Another object of the present invention is to provide a hazard prevention control circuit which operates to disconnect the power to the heating elements of an immersion heater when a crack occurs in the quartz tube enclosing the heating elements.

Another object of the present invention is to provide a hazard prevention control circuit which operates to disconnect the power to the heating elements of an immersion heater when the level of the solution in the tank drops such that it cannot provide sufficient cooling for safe operation of the heater.

Another object of the present invention is to provide a hazard prevention control circuit which is coupled to the power circuits by isolating transformers so as to assure that the operator and the components of the hazard prevention control circuit are protected in the event that the quartz tube of the immersion heater breaks exposing the solution in the tank to the voltage of the power supply.

These and other objects, features and advantages of the present invention will be more fully understood from the following specification when taken in conjunction with the following drawings wherein.

Figure 1:
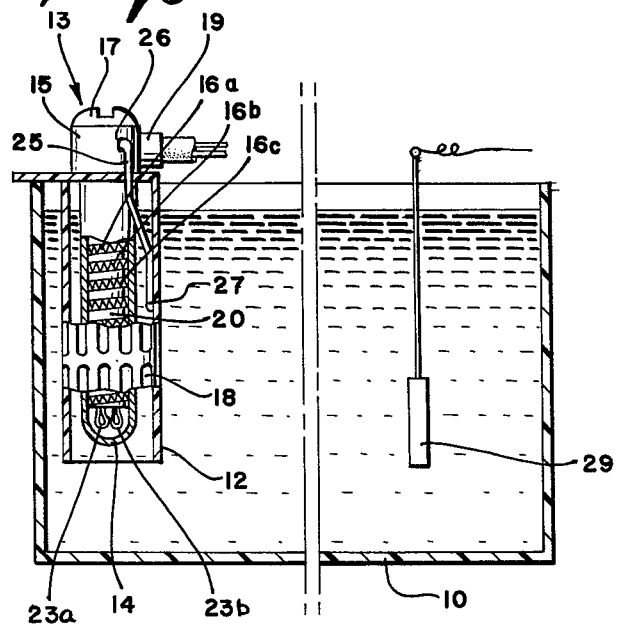
FIG. 1 is a view showing a tank of solution having mounted on the side thereof an electric immersion heater which incorporates the hazard prevention control circuit of the present invention.

Referring to the drawings, FIG. 1 illustrates a plastic lined tank 10 filled with a solution to be used for plating metal parts. Mounted in a fixed position on the side of the tank is a plastic guard 12 which extends down into the solution. The guard 12 has a rectangular cross-section and is provided with spaced elongated slots 18 on the sidewalls thereof to permit the solution in the tank to freely circulate therethrough.

An electric immersion heater 13 for heating the solution in the tank is positioned within the guard 12. The immersion heater 13 comprises an elongated quartz tube 14 having a junction box 15 provided with a removable cap 17. Enclosed within the quartz tube 14 is an elongated ceramic core 20 having three parallel helically disposed grooves formed along the length thereof. Three heating coils 16a, 16b and 16c are wound about the core such as to lie in these three helical grooves, respectively. Extending through openings in the longitudinal center of the ceramic core 20 are a pair of metal probes 23a and 23b, the bottom ends of which are curved upwardly to form spaced loops in the bottom the quartz tube.

Leads from the three heating coils 16a, 16b, and 16c, and the leads connected to the upper ends of the two probes 23a and 23b extend up into the junction box 15 and out an opening in a boss 19 formed on its side, as shown in FIG. 1.

The quartz tube 14 portion of the immersion heater 13 is inserted down into an opening in the top of the guard 12 with the bottom of the junction box 15 resting on the top of the guard. When so positioned the quartz tube 14 with the heating coils 16a, 16b and 16c and the probes 23a and 23b therein is immersed in the solution of the tank 10. The diameter of the quartz tube 14 is small compared to the cross-sectional configuration of the guard 12 such that the solution in the tank can freely circulate through slots 18 and about the quartz tube.

Attached on the inner wall of the guard 12 at a point approximately midway of the length thereof is a flexible plastic tube 25 enclosing a thermistor 27 and its leads. The upper end of the plastic tube fits into an opening 26 on the side of the junction box 15 enabling the leads for the thermistor 27 to extend out of the boss 19 of the junction box with the other leads of the heater.

It should be noted that a temperature sensor 29 is also suspended in the solution of the tank 14 at a point removed from the immersion heater 13.

Figures 2, 3:
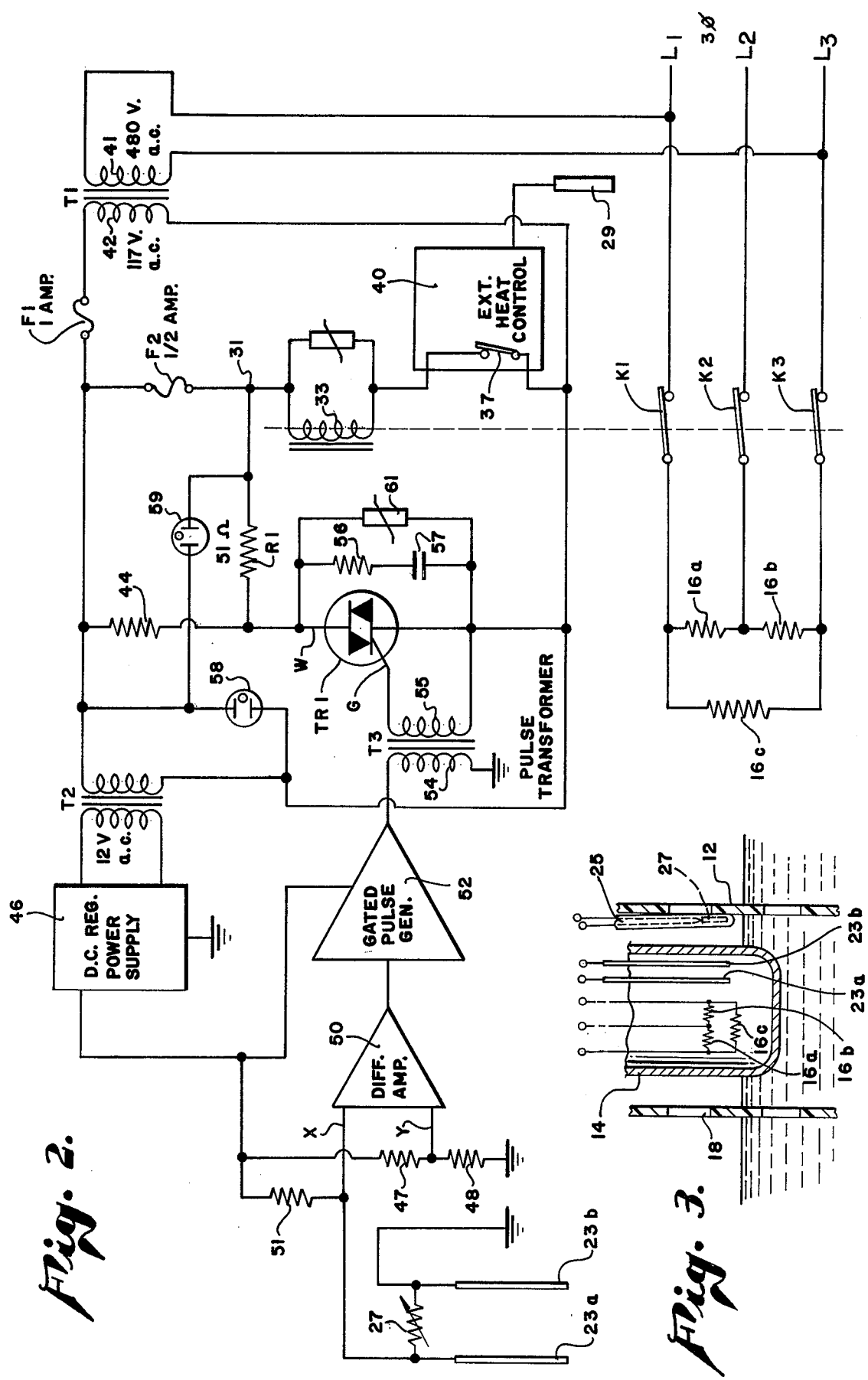
FIG. 2 is a schematic circuit diagram of the hazard prevention control circuit.
FIG. 3 is a schematic illustration showing a pair of crack detector probes within the quartz tube of the immersion heater and the thermistor attached on the guard therefor.

Reference will next be made to the hazard prevention control circuit of the present invention as illustrated in FIG. 2. Three main power lines L1, L2 and L3 of a three phase 480 volt a.c. power supply are respectively connected through contacts K1, K2, and K3 to have a delta connection with the three heating coils 16a, 16b and 16c of the immersion heater 13. Two of the lines L1 and L3 of the three phase power supply are connected across the primary 41 of a step down transformer T1, the secondary 42 of which provides 117 volt a.c. power through a one ampere fuse F1 for the circuit of the present invention. The output of the one ampere fuse F1 is connected through a one-half ampere fuse F2 to a junction 31 which conducts through a contactor coil 33 and through a thermal switch 37 of an external heat control 40 to the return side of the 117 volt a.c. supply. The contactor coil 33 energizes an armature which controls the setting of the contacts K1, K2 and K3. It should be understood that the fuses F1 and F2 may be other types of circuit breakers.

Connected to junction 31 is a current path which extends parallel to the path which includes the contactor coil 33 and the external heat control 40. This parallel current path includes a load resistor R1 in series with a triac TR1. A resistor 56 and compacitor 57 are connected in series across the terminals of the triac TR1 to dampen the affect of transient voltages and a varistor 61 is connected thereacross to limit the voltage transients.

The 117 volt a.c. supply voltage is coupled through a power transformer T2 to provide a 12 volt a.c. voltage to a d.c. regulated power supply 46. The d.c. voltage of the regulated power supply 46 is fed to a fixed voltage divider comprising a resistor 47 connected to a resistor 48 which is grounded. The common junction of resistors 47 and 48 provide a reference voltage which is connected to a first input Y of a differential amplifier 50. The d.c. voltage of the regulated power supply 46 is also fed through a variable voltage divider comprising a fixed resistor 51 connected to ground through a pair of parallel resistance paths. One of these paths is formed by the thermistor 27 and the other is formed by the conductive path between the ends of the two probes 23a and 23b when moisture or solution is present in the quartz tube. The common junction of the variable voltage divider is connected to the other input X of the differential amplifier 50.

The output of the differential amplifier 50 is connected to a gated pulse generator 52 which is supplied by the d.c. voltage from the regulated power supply 46. The output of the gated pulse generator 52 is, in turn, connected to the primary winding 54 of a pulse transformer T3, the secondary winding 55 of which is connected to the gate input G of the triac TR1.

The operation of the hazard prevention control circuit will next be described. Normally the voltage at the input X of the differential amplifier circuit 50 is at a higher voltage level above ground than the reference voltage provided at input Y, as indicated by the waveforms in FIG. 5, and the output of the differential amplifier 50 is at a low voltage level, as indicated. Under these conditions, the gated pulse generator 52 does not provide pulses on its output and the triac TR1 does not conduct the a.c. current represented by waveform W.

Thus, when current from the 117 volt a.c. supply, as represented by waveform W, is passed through the fuse F2, the contactor coil 33, and the closed switch 37 of the external heat control 40, the energizing of the contactor 33 closes contacts K1, K2 and K3 providing power to the three heating coils 16a, 16b, and 16c. The temperature sensor 29 senses the temperature of the solution in the tank 10 and feeds a signal to the external heat control 40 to operate the opening and closing of switch 37 to maintain the solution at a selected temperature setting. Thus, periodically, during the operation of the tank 10, when the solution therein heats up to a value greater than the setting of the external heat control 40, the switch 37 therein opens. This terminates the conductance of current through the contactor coil 33 and causes the contacts K1, K2 and K3 to open thereby cutting off the power to the heater coils 16a, 16b and 16c. When the solution again cools down to a predetermined temperature value, the temperature sensor 29 causes the switch 37 therein to again close to thereby close the contacts K1, K2 and K3 and bring the solution up to the desired temperature. In any event, if the solution in the tank heats up above a safe value for any reason, the temperature sensor 29 detects this condition and operates to cut off the power.

Figure 5:
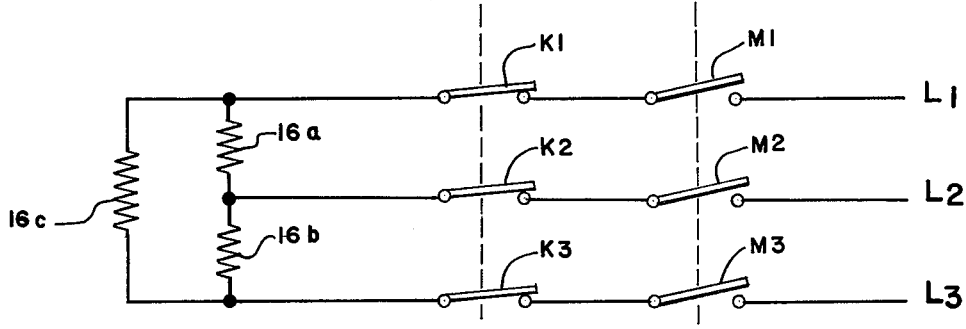
FIG. 5 shows waveforms for explaining the operation of the hazard prevention control circuit.
Figure 5:
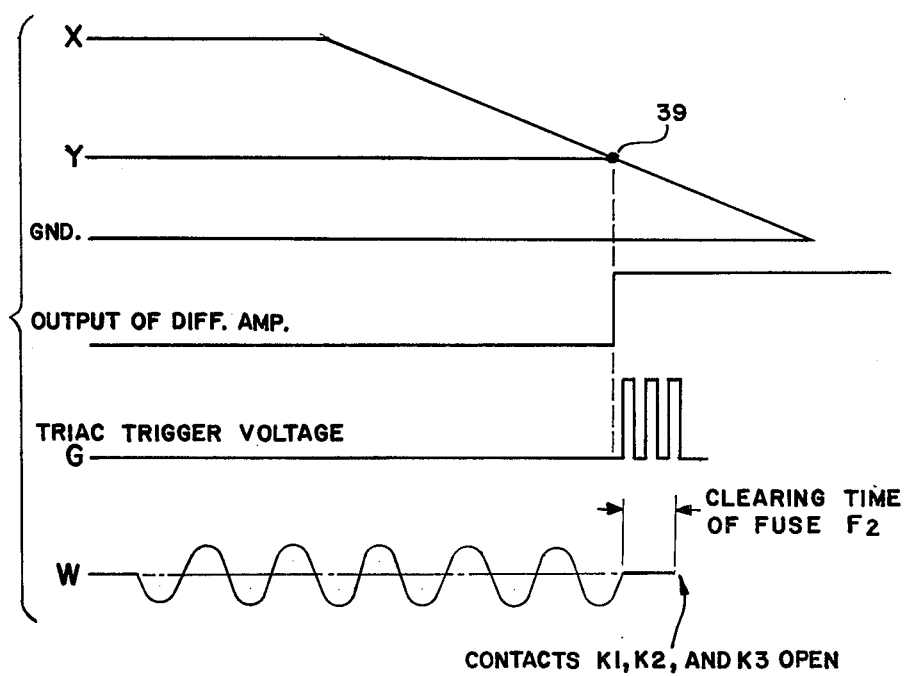

The operation of the circuit when a hazard is detected is illustrated by the waveforms in FIG. 5. Thus, when a fault occurs in the plating equipment, i.e., if the crack detector probes 23a and 23b should conduct due to the presence of moisture in the quartz tube 14 or if the resistance of the thermistor 27 is reduced by the excess heat caused by the lowering of the level of the solution in the tank, the triac TR1 conducts causing an excess current to flow through the fuse F2. This excess current blows the fuse F2 causing the contactor coil 33 to be deenergized and resulting in contacts K1, K2 and K3 opening. This removes the power on the main lines L1, L2 and L3 from the three heating coils 16a, 16b and 16c and affords protection to the operator and equipment.

It should now be clearly understood that whenever either the probes 23a and 23b start to conduct as a result of either the quartz tube 14 breaking or the thermistor 27 senses an increase in temperature resulting from the fluid in the tank dropping in level, the resistance between input X and ground is reduced and lowers the voltage thereon toward the level of the reference voltage on input Y. When the voltages on the inputs X and Y are equal as indicated by point 39 in FIG. 5, differential amplifier 50 fires causing its output to switch to a higher voltage level. This causes the gated pulse generator 52 to start passing pulses to the primary winding 54 of the pulse transformer T3 and causes the pulses on its secondary 55 to be fed to the gate input G of the triac TR1 resulting in the triac TR1 being triggered to conduct. The conduction through the triac TR1 momentarily increases the current load through the fuse F2 causing it to blow. This results in the contactor coil 33 being deenergized at the end of the clearing time of the fuse and the contacts K1, K2 and K3 opening to disconnect the power from the heating coils.

It should be noted that a neon light 58 is provided across the output of step down transformer T1 which is lit when power is applied across the control circuit, i.e., as long as the one ampere fuse F1 is conducting. In addition, a neon light 59 is normally off. However, when the fuse F2 blows, neon light 59 turns on as a result of the voltage drop across resistor 44 indicating that the control circuit has detected a fault. Thus a fault operating condition of the control circuit is indicated by both neon lights 59 and 58 being lit.

In view of the above, it should now be evident that the hazard prevention control circuit of the present invention is responsive to either the pair of probes 23a and 23b or the thermistor 27 to provide protection for the operator of the plating equipment. Thus, in the event that quartz tube 14 becomes cracked, the pair of crack detector probes 23a and 23b conduct through the fluid and open the contacts K1, K2 and K3 disconnecting the power from the heating coils. Furthermore, in the event that the level of the fluid in the tank should ever drop below a safe level, the thermistor 27 senses the condition and opens the contacts K1, K2 and K3 thereby disconnecting the power from the heating coils.

Figure 4:
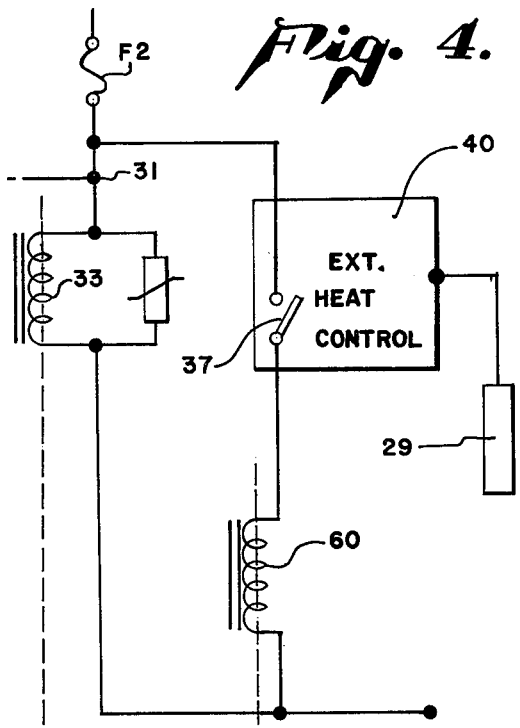
FIG. 4 shows a modified portion of the hazard prevention control circuit of FIG. 2.

A modification to a portion of the circuit in FIG. 2 is shown in FIG. 4. As noted in FIG. 2, the circuit of the external heat control 40 is in series with the contactor coil 33 and, because of its response to the temperature sensor 29, serves to periodically open the contacts K1, K2 and K3 all the while the tank 10 is being operated. Thus, if the contacts K1, K2 and K3 happen to become welded closed, as a result of arcing for example, both the control circuit and external heat control 40 will be ineffective. However, as shown in FIG. 4, the modified circuit provides for the external heat control 40 to have its own contactor coil 60 which operates a separate set of contacts M1, M2 and M3 connecting the main lines L1, L2 and L3 to the heating coils. Thus, if the set of contacts of either of these circuits fails to operate for any reason the other set can still operate in the manner provided to control power to the heater.

It should be noted that the power transformer T2 and pulse transformer T3 provide for electrically isolating the operator and the hazard prevention control circuit from the three phase power supply on lines L1, L2 and L3. Thus, if the quartz tube of the immersion heater 13 were to crack and these transformers were not present, power from the main supply lines applied on the housing coil 16a, 16b and 16c could pass through the solution in the tank and through to the operator causing an electrical shock hazard. Further, when the high voltage heater power is exposed to the solution in the tank, it would be possible to destroy one or more components of the hazard prevention control circuit before it can operate to blow the fuse F2 to disconnect the power.

It is further noted that the one ampere fuse F1 distributes power to both the hazard prevention control circuit and the contactor coil 33, and that the one-half ampere fuse F2 is placed in series with the contactor coil 33 so that if it happens to blow the one ampere fuse F1 will not be affected. Thus, when the triac TR1 is triggered into conduction, it causes at least two amperes of current to flow through the load resistor R1 providing a considerable overload on fuse F2. This causes the fuse F2 to blow, thus deenergizing the contactor coil 33. It is noted that the two amperes of current is drawn through the circuit for too short a duration to affect the one ampere fuse F1.

Although, in order to comply with the statutes, the device of the present invention has been described in language more or less specific as to the structural features, it is to be understood that the invention is not limited to the specific features shown and described but that the means and construction herein disclosed comprise only the preferred form of putting the invention into effect. The invention is claimed, therefore, in any of its forms or modifications within the legitimate and valid scope of the appended claims.

What is claimed is:

1. A hazard prevention control circuit for an immersion heater having heating elements enclosed in an envelope immersed in a tank of solution to be heated, said control circuit comprising:
   a circuit breaker;
   a contactor having a contactor coil and a set of contacts for connecting an a.c. supply to said heating elements;
   power supply means connected to supply current through said circuit breaker to energize said contactor coil;
   a load circuit including a normally non-conducting thyristor having a gate input, said load circuit connected in parallel with said contactor coil;
   a sensing circuit including sensing means responsive to a malfunctioning of said immersion heater to generate an a.c. signal;
   a power transformer coupled to said power supply means to supply power for operating said sensing circuit; and
   a pulse transformer for coupling said a.c. signal to the gate input of said thyristor to thereby draw an excess current through said load circuit which blows said circuit breaker and deenergizes said contactor coil.

2. The hazard prevention control circuit as defined in claim 1 wherein said circuit breaker is a fuse.

3. The hazard prevention control circuit as defined in claim 1 wherein said sensing means includes a thermistor positioned in said tank at a predetermined level adjacent said envelope to detect a drop in the level of the solution in the tank.

4. The hazard prevention control circuit as defined in claim 1 wherein said sensing means includes a pair of spaced probes extending into the bottom of said envelope for detecting the presence of moisture therein.

5. A hazard prevention control circuit for an immersion heater having heating elements enclosed in a quartz tube immersed in a tank of solution to be heated, said control circuit comprising:
   a main a.c. supply;
   a contactor having a contactor coil and a set of contacts for connecting said main a.c. supply to said heating elements;
   a circuit breaker;
   a step down transformer coupled to said main a.c. supply and connected to supply current through said circuit breaker to energize said contactor coil;
   a series circuit including a load resistor and a normally non-conducting triac connected in parallel with said contactor coil;
   a d.c. regulated power supply;
   a power transformer coupled to the output of said step down transformer for supplying energy to said d.c. regulated power supply;
   a sensing circuit energized by said d.c. regulated power supply and including sensing means operable in response to a malfunctioning of said immersion heater to generate pulses; and
   a pulse transformer for coupling said pulses to cause said triac to conduct;
   whereby when said sensing means senses a malfunctioning of said immersion heater said triac conducts to cause excess current to flow through said series circuit and blow said circuit breaker to deenergize said contactor coil and open said set of contacts.

6. The hazard prevention control circuit as defined in claim 5 wherein said sensing circuit includes:
   a differential amplifier having a pair of inputs and an output;
   a fixed voltage divider connected to said d.c. regulated power supply to provide a reference voltage on one input of said differential amplifier;
   a variable voltage divider connected to said d.c. regulated power supply, said variable voltage divider including said sensing means and responsive to the malfunctioning of said immersion heater to change the voltage level on the other input of said differential amplifier and thereby change the voltage level on the output thereof; and
   a gated pulse generator responsive to the change in voltage level on the output of the differential amplifier to provide pulses to said pulse transformer to cause said triac to conduct.

7. The hazard prevention control circuit as defined in claim 6 wherein said sensing means includes a thermistor positioned in said tank at a predetermined level adjacent said quartz tube to detect a drop in the level of the solution in said tank.

8. The hazard prevention control circuit as defined in claim 6 wherein said sensing means includes a pair of spaced probes extending into the bottom of said quartz tube for detecting the presence of moisture therein.

9. The hazard prevention control circuit as defined in claim 5 including a solution heat control having a switch; and wherein said contactor coil has said switch connected in series therewith.

10. The hazard prevention control circuit as defined in claim 5 including a second contactor having a second contactor coil and a second set of contacts for further connecting said main a.c. supply to said heating elements; and
   a solution heat control having a switch; and
   wherein said contactor coil has connected in parallel therewith a circuit including said switch in series with said second contactor coil.

* * * * *